US005494012A

United States Patent [19]
Hagen

[11] Patent Number: 5,494,012
[45] Date of Patent: Feb. 27, 1996

[54] PRE-OILER

[76] Inventor: Terry L. Hagen, 684 Terra Dr., Corona, Calif. 91719

[21] Appl. No.: 343,179

[22] Filed: Nov. 22, 1994

[51] Int. Cl.$^6$ ..................................................... F01M 5/00
[52] U.S. Cl. ........................................ 123/196 S; 184/6.3
[58] Field of Search ........................... 123/196 R, 196 A, 123/196 S; 184/6.3, 6.4

[56] References Cited

U.S. PATENT DOCUMENTS

| | | | |
|---|---|---|---|
| 3,583,525 | 6/1971 | Holcomb | 123/196 S |
| 4,061,204 | 12/1977 | Kautz, Jr. | 184/6.3 |
| 5,014,820 | 5/1991 | Evans | 123/196 S |
| 5,069,177 | 12/1991 | Dokonal | 123/196 S |
| 5,156,120 | 10/1992 | Kent | 123/196 S |
| 5,244,059 | 9/1993 | McLaughlin | 184/6.3 |
| 5,348,121 | 9/1994 | McLaughlin | 184/6.3 |

Primary Examiner—Henry C. Yuen
Assistant Examiner—Erick Solis
Attorney, Agent, or Firm—Knobbe, Martens, Olson & Bear

[57] ABSTRACT

A pre-oiling system for automatically injecting oil into the oil gallery lubricating system of an automotive engine prior to start up. The assembly includes an outer vessel, a manifold valve block, which is attached to the outer vessel and includes a solenoid valve, and a control circuit for logic control of the solenoid valve. An air replenishment assembly is positioned on the outer vessel permitting measurement of the pressure in the outer vessel and also allowing for air to be added to the outer vessel to pressurize oil contained within the outer vessel. In one embodiment, the air replenishment assembly includes a schrader valve which provides replacement air to the outer vessel and the spare tire. Oil is automatically injected into the oil gallery lubricating system upon the engine starting. Specifically, the solenoid valve is opened in response to the engine being started which allows pressurized oil to flow from the outer vessel to the oil gallery of the engine. During operation of the engine, oil is pumped into the outer vessel and the air is pressurized for subsequent starting operations of the engine. In one embodiment, the outer vessel also includes an additional inner vessel that has pressurized air and oil which will provide the oil upon the engine turning off to a turbocharger.

7 Claims, 6 Drawing Sheets

PRE-OILER

BACKGROUND OF THE INVENTION

The use of pre-oiling pumping devices and oil reservoirs or accumulators of different designs in conjunction with internal combustion engines is generally well known. It has been an acknowledged fact that a great deal of engine wear occurs during engine startup. "Its a terrible thing to start your engine", i.e., engine experts have demonstrated that the majority of mechanical engine wear occurs during engine start up. That is because as soon as your car's engine is shut off, gravity begins pulling oil back into the pan along with any additives it contains. And after a few hours, no protective coating remains to lubricate your engine. As a result, exposed mechanical engine parts grind together at start-up until oil can begin circulating again. At those first critical seconds during start-up, permanent damage occurs. Various pre-oiling devices have been designed, all having the purpose of providing oil pressure to the engine and turbocharger prior to start up as well as to the turbocharger during coast down. However, a number of these pre-oilers have been bulky, complex, cumbersome, expensive, have often required pumps, and have generally been unacceptable for use in commercial passenger vehicles.

SUMMARY OF THE INVENTION

In accordance with one embodiment of the present invention, a pre-oiler is described for providing oil flow and pressure to an engine just prior to start up; and oil flow and pressure to the turbocharger after engine shutdown. The pre-oiler assembly includes an outer vessel consisting of a top plate, cylinder, bottom plate, and longitudinal bolts. This outer vessel holds pressurized air and engine oil. The functional design of the end plates, optional attachment bracket, and longitudinal bolts which hold and seal the cylinder, allow different cylinder lengths to be easily used. The top plate has a schrader valve, so the air pressure in the vessel can easily be measured and adjusted. The bottom plate includes the manifold valve block. It is a manifold valve block consisting of: a screw in solenoid valve, metered flow orifice, check valve, float-shutoff valve, safety pressure relief valve, and multiple outlet ports. The solenoid valve coil has a built in control circuit for activation of the solenoid valve, which requires only 2 hookup wires to the ignition switch ("on" and "start" terminals) and a ground wire.

An optional inner vessel to provide post lubrication for a turbocharger can be installed inside the pre-oiler outer vessel. It includes an additional cylinder, o-rings, hose, oil hose connection, and turbo check valve. This additional vessel operates as an accumulator and stores engine oil under pressure during operation. Upon shut off of the engine the accumulated oil under pressure flows to the turbocharger.

An optional air replenishment hose can be installed between the spare tire and the outer vessel. This will automatically restore air in the outer vessel, which is lost as small air bubbles mixing in the oil during operation. A hose fitting at the spare tire allows air to flow into the hose, and then through a tee fitting and check valve into the outer vessel.

The novel features of the invention are set forth with particularity in the appended claims. The invention will be best understood from the following description when read in conjunction with the accompanying drawings.

BRIEF DESCRIPTION OF THE DRAWINGS

FIG. 2A is a view of the top front.

DESCRIPTION OF THE PREFERRED EMBODIMENT

Figure 1:
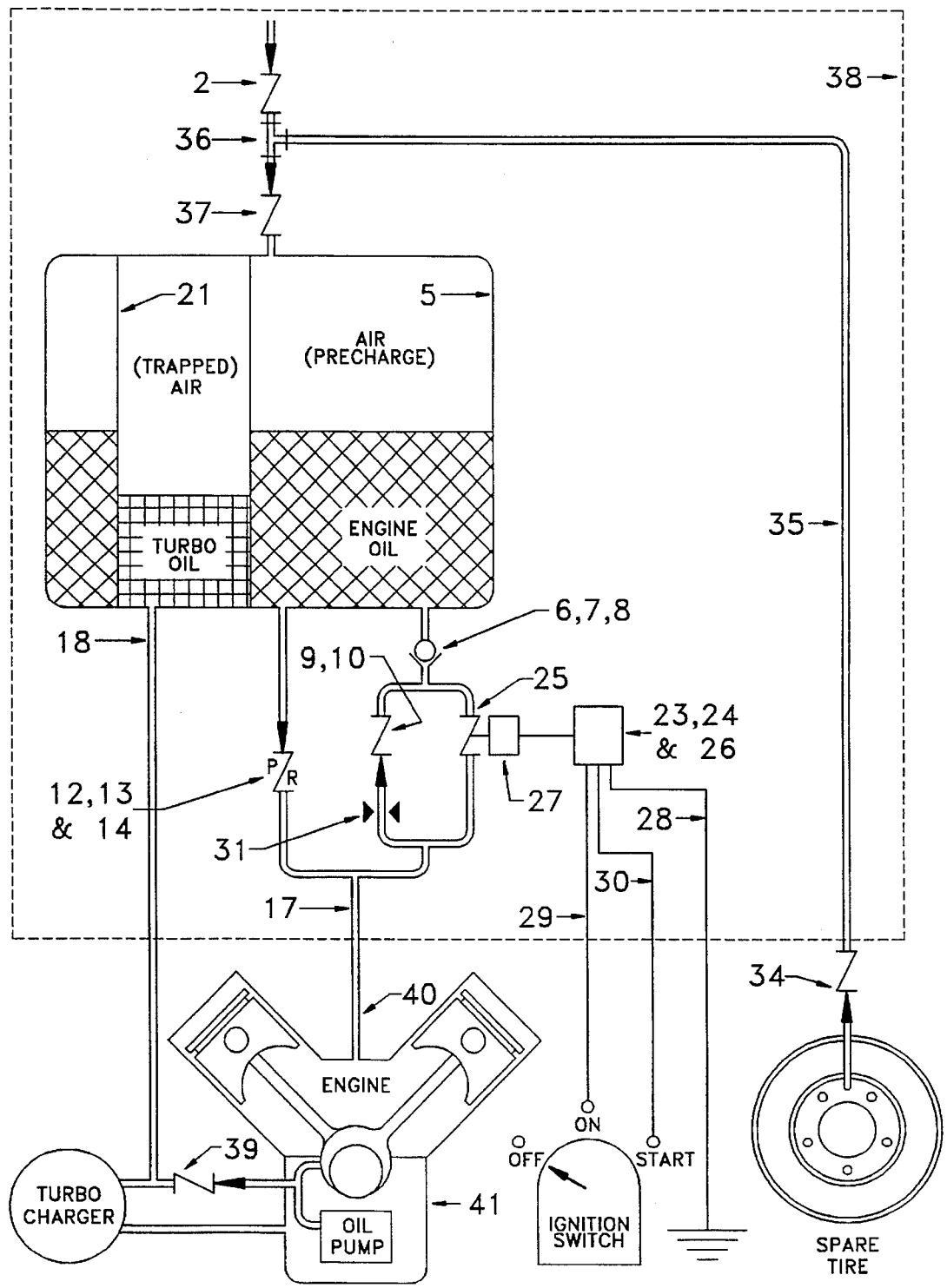
FIG. 1 is a schematic diagram of the pre-oiler apparatus of the present invention, with two oil hoses connected to an engine with a turbocharger. An air replenishment hose is connected to the vehicles spare tire. In addition, two wires are connected to the engine's ignition switch, and a third to the ground.
Figure 2A:
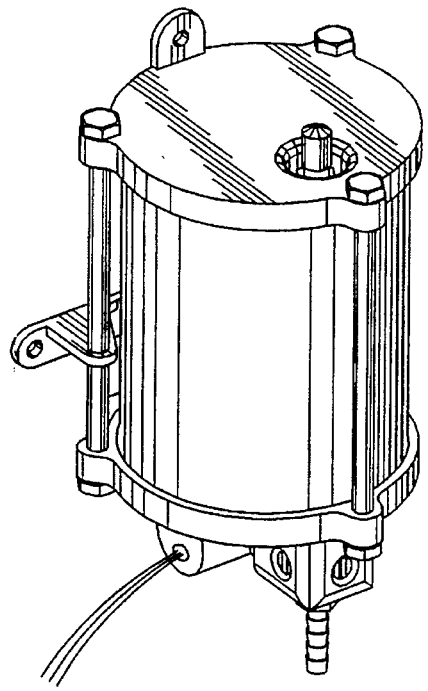
FIG. 2A, B, C, D are isometric exterior views of the pre-oiler apparatus without the optional air replenishment device.
Figure 2B:
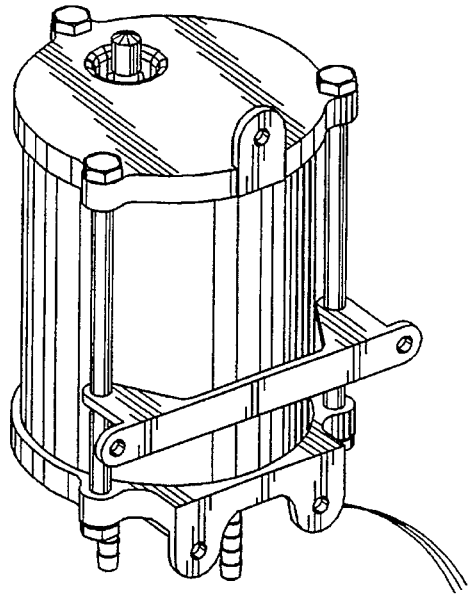
FIG. 2B, a view of the top rear.
Figure 2C:
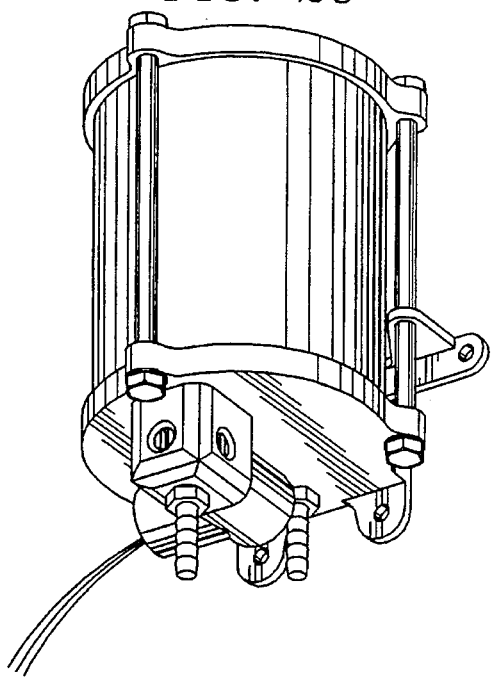
FIG. 2C, a view of the bottom front.
Figure 2D:
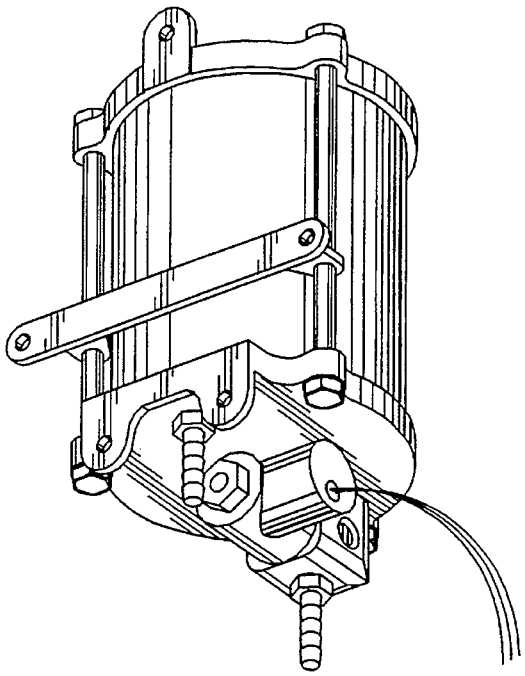
FIG. 2D, a view of the bottom rear.
Figure 3:
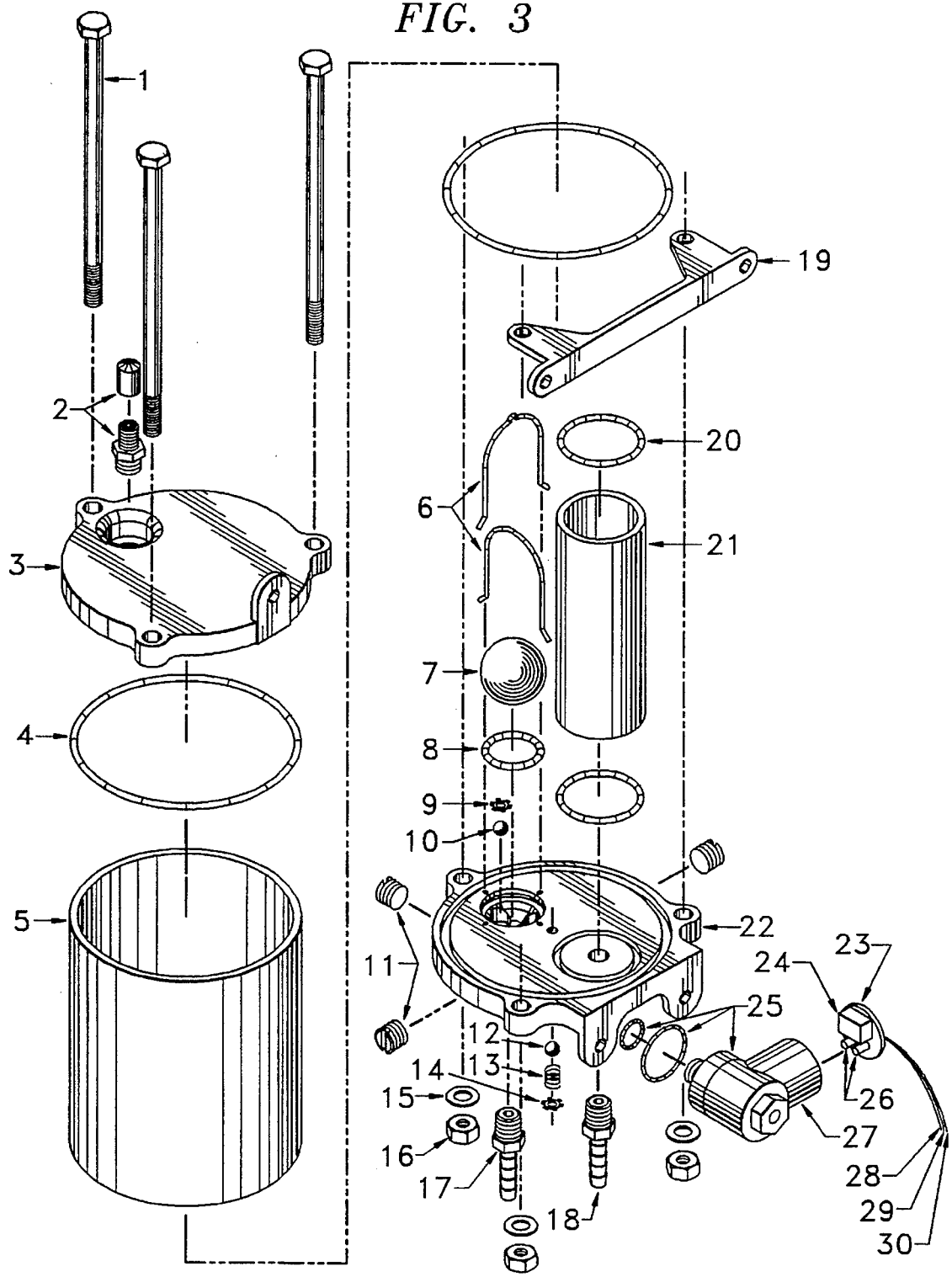
FIG. 3 is an exploded isometric view from the top rear of the pre-oiler apparatus without the optional air replenishment device.
Figure 4:
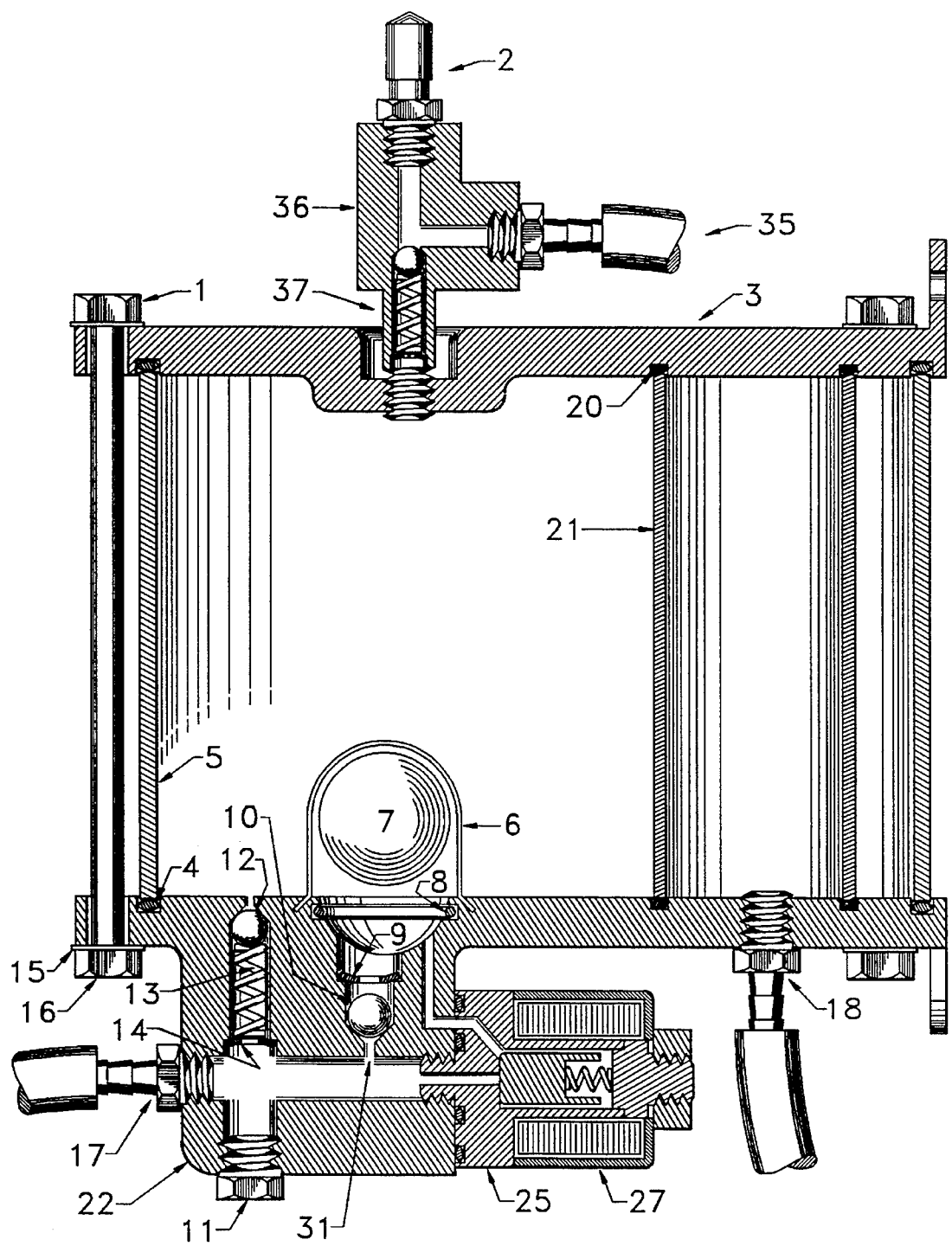
FIG. 4 is a sectional view of the pre-oiler apparatus, with the sectional plain cut through the vertical axis and from the front to back.
Figure 5A:
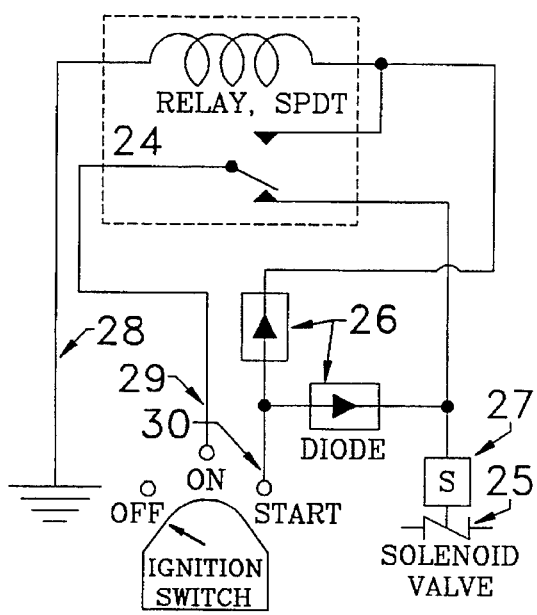
FIG. 5A, B, C, D are of the electrical schematic of the control circuit during it's operational sequence. They show the four steps the circuit goes through during engine start up with the ignition switch.
Figure 5B:
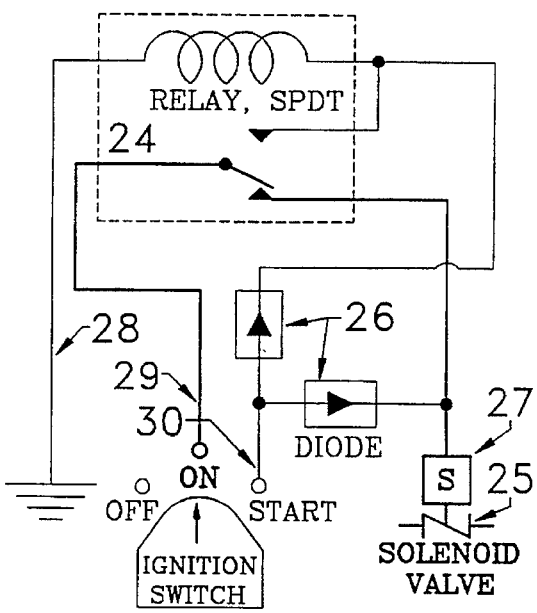
Figure 5C:
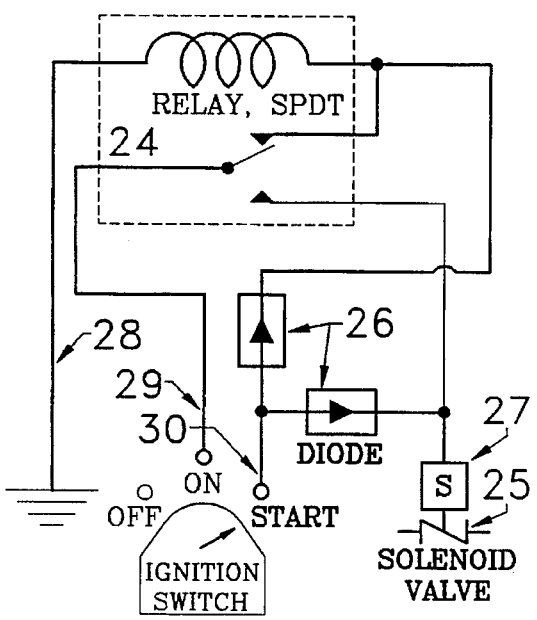
Figure 5D:
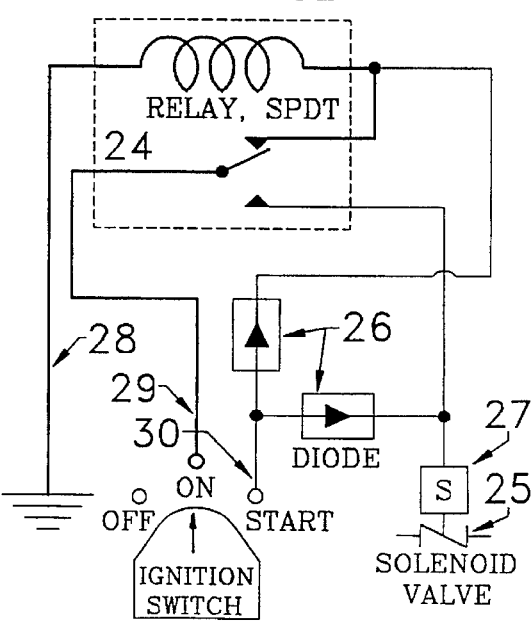

FIG. 1 & 3 illustrates a pre-oiling system 38 for automatically injecting oil into the oil gallery 40 lubricating system of an automotive engine 41 prior to start up of the engine; and injecting oil into the turbocharger after engine shutdown. FIG. 4 illustrates the principal elements of the pre-oiler apparatus: 1) A manifold valve block consisting of: a screw-in solenoid valve 25, metered flow orifice 31, check valve 9, 10, float-shutoff valve 6, 7, 8, safety pressure relief valve 12, 13, 14, and multiple outlet ports with screw-in plugs 11 which provide optional routing of the outlet port 17; 2) An outer vessel consisting of a top plate 3, outer cylinder 5, bottom plate 22, o-rings 4, longitudinal bolts 1, washers 15, and nuts 16; 3) An inner vessel 21 with o-rings 20 to provide post lubrication for a turbocharger; 4) A control circuit 23, 24, 26 shown in FIG. 3 for activation of the solenoid coil 27 and valve 25, which requires only 2 hookup wires 29, 30 shown in FIG. 1, to the ignition switch ("on" and "start" terminals), and a ground wire 28.

Figure 6:
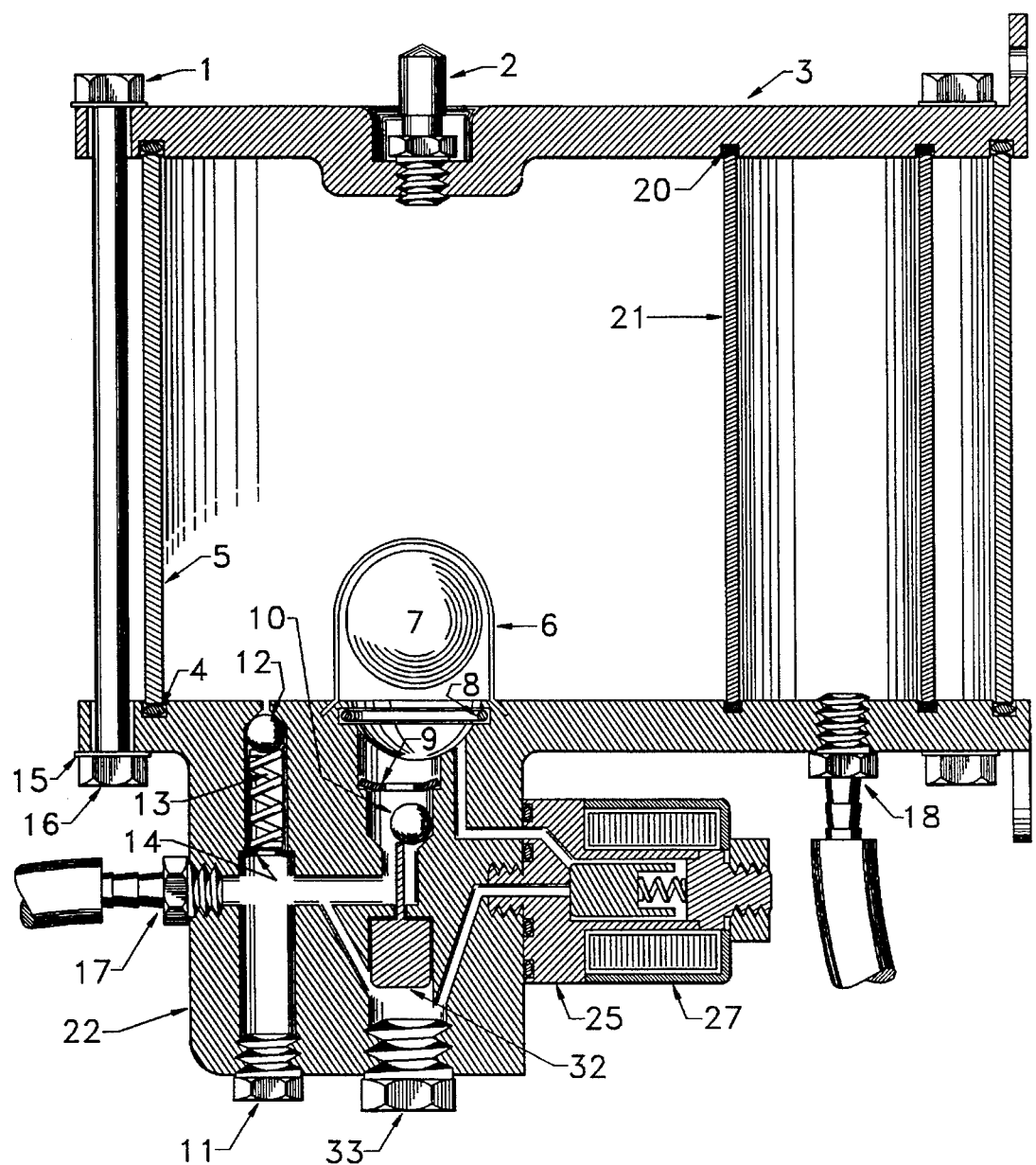
FIG. 6 is a sectional view similar to that of FIG. 4 without the optional air replenishment device, but modified to include a pilot operated check valve which provides an additional flow path for an increased flow rate.

FIG. 1 also illustrates the optional air replenishment device that will automatically restore air in the outer vessel, which is lost as small air bubbles mixing in the oil during operation. An extension fitting 34 at the spare tire allows air to flow into the air hose 35, and then through the tee fitting 36 and air check valve 37 into the outer vessel. The air check valve prevents back flow out of the outer vessel. Air freely flows from the spare tire to the outer vessel, whenever the pressure in the outer vessel is less than the spare tire. In this optional configuration as shown in FIG. 4, the schrader valve 2 is located on the top of the tee fitting to allow periodic refill of air in the spare tire. When the optional air replenishment device is not used, the schrader valve is installed in the top plate as shown in FIG. 6. In this configuration the schrader valve is used to add or remove air in the outer vessel, as well as measure the air pressure in the outer vessel.

The inner vessel, which provides post lubrication for a turbocharger, is optional. It is included in the pre-oiler system if the engine is equipped with a turbocharger. The cylinder 21 for the turbo option, as shown in FIG. 1 & 3, fits inside the outer vessel. It includes o-rings 20, turbo oil hose connection 18, and turbo check valve 39. Both the inner cylinder 21 and outer cylinder 5 share the same top plate 3 and bottom plate 22. The o-rings 20 seal the inner cylinder from the outer cylinder. As shown in FIG. 1 the turbo oil hose connection 18 ties into the turbocharger oil supply line running from the engine to the turbocharger. Up stream of the tie in point, in the turbocharger oil supply line, the turbo check valve 39 is installed. At engine shutdown, the turbo check valve directs the flow from the inner vessel only to the turbocharger, and not back into the engine. The inner vessel, which initially only has air at atmospheric pressure in it, operates as a simple accumulator. When the engine is running, the engine's oil will flow inside the inner vessel and compress the air inside. Upon shut off of the engine, the accumulated oil will flow out under pressure to the turbocharger. This provides continued oil flow to the turbocharger after engine shut off, during the period that the turbo coasts down and stops. Since the engine oil pump stopped when the engine was shut off, oil flow is still needed during the coast down period of the turbocharger.

FIG. 4 illustrates the manifold valve block which is included in the bottom plate 22. The screw-in solenoid valve 25 is a normally-closed type activated by the control circuit. The check valve consist of a machined hole and seat with an elastic ball 10 and an internal friction washer 9 to keep the ball in the hole. This check valve and the orifice 31 allow one way metered flow from the engine to the outer vessel, when the oil pressure is higher in the engine than the outer vessel. The outer vessel is initially filled with compressed air through the schrader valve 2 to an air pressure of 30 PSI, which is approximately half of the engines peak operating oil pressure. The air pressure insures that the last drop of oil exits the outer vessel under pressure into the engine. After each engine start, the outer vessel will refill approximately half full with engine oil. It will slowly fill up half way with engine oil which flows up through the orifice and check valve. The check valve is designed to close off and hold peak oil pressure in the outer vessel, corresponding to the maximum oil pressure obtained by the engine during its range of operation at different Rpm's. During the pre-oiling operation when the ignition key is turned to the on position, but the car has not yet been started, oil flows under pressure out of the outer vessel into the oil gallery 40 of an engine 41. As the oil level in the outer vessel drops, the float-shutoff valve 6, 7, 8 will close to prevent loss of the pressurized air in the outer vessel. The float-shutoff valve is made up a wire cage 6 which houses the float 7, and an o-ring 8 seat which forms a seal with the float. The float-shutoff valve also prevents the injection of air into the engine oil galleries. The pressure relief valve 12, 13, 14 is included in the valve block as a safety feature. It would only operate to relieve over pressurization due to a combination of the loss of the pressurized air in the outer vessel, the subsequent filling up of oil in the outer vessel, and thermal expansion of the oil caused by heat in the engine compartment. This over pressurization would be the result of the vessel being completely filled with oil, with no room for thermal expansion. The pressure relief valve is made up of a machined hole and seat with an elastic ball 12 and spring 13, and an internal friction washer 14 to keep the ball and spring compressed in the hole against the seat. The multiple outlet ports with screw in plugs 11 allow the option of routing the outlet port 17 orientation in the most direct path to the oil gallery 40 on the engine. With the under the hood space getting tighter on the newer cars, the most compact design and minimum plumbing is desired. Also the valve block provides optional outlets for additional hose connections to the engine, if desired.

The control circuit board 23 has a SPDT (single pole double throw) relay 24 and two diodes 26, that activate the solenoid coil 27 which opens the solenoid valve 25. FIG. 5 illustrates the steps the circuit goes through during the engine starting sequence, with the ignition switch. The solenoid valve opens for full unrestricted oil flow into the engine prior to and during cranking the engine. The normally closed solenoid valve opens only during the initial operation of the ignition switch in the "on" (FIG. 5B) and subsequent "start" (FIG. 5C) positions. When the ignition switch is returned to the "on" (FIG. 5D) position, after starting the engine, the control circuit deactivates the solenoid coil and the solenoid valve closes. When the ignition switch is turned off (FIG. 5A), the circuit deactivates and is ready to go through the steps again.

Although the volume of the vessel can be changed by exchanging cylinders, generally it will be sized to store less than half a quart (2 cups) of oil. Removing (storing) or adding (injecting) this amount of oil will not significantly affect the oil level in the engine. The total volume of an engine's oil galleries and bearing clearances is less than a cup of oil, so the unit is more than adequate fully lubricate the engine.

FIG. 2A–D & 3 illustrate the functional design of the top and bottom end plates 3 & 22, optional attachment bracket 19, and longitudinal bolts 1 which hold the cylinder; allow different cylinder lengths to be easily used. The cylinder length can be reduced for better fit in smaller engine compartments and to reduce the total oil storage volume. A longer cylinder would be used to increase the total storage volume.

FIG. 6 illustrates an optional configuration which could be used to increased the oil flow rate out of the pre-oiler system. This could be accomplished by modifying the manifold valve block to incorporate a pilot operated check valve 32, 33, which provides an additional exit flow path through the manifold valve block. The pilot operated check valve consists of routing the flow from the solenoid valve under the piston 32 which would cause the piston to raise up and move the check valve ball 10 off of its seat and allow an additional flow path. The additional plug 33 is for machining access and installation of the piston.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. A pre-oiler system for providing oil to an oil gallery of a vehicle's engine, prior to ignition of the engine, wherein the vehicle has a spare tire, comprising:

an outer vessel which is configured to receive oil and air so that oil contained within said outer vessel can be maintained under pressure;

an air replenishment assembly which supplies air to said outer vessel from said spare tire so as to maintain said oil under a desired pressure;

a check valve in fluid communication with said outer vessel and said engine oil gallery wherein said check valve allows oil to flow into said outer vessel from said engine oil gallery when said engine is operating; and a solenoid valve in fluid communication with said outer vessel and said engine oil gallery wherein said solenoid valve allows oil to flow from said outer vessel to said engine prior to and during cranking of said engine.

2. The system of claim 1, wherein said air replenishment assembly is configured to allow air to flow from said spare tire to said outer vessel whenever the pressure in the outer vessel is less than the pressure in said spare tire and wherein said air replenishment assembly includes an air check valve which prevents back flow out of air out of said outer vessel.

3. The system of claim 2, wherein said air replenishment assembly includes a tee-fitting and a schrader valve wherein said schrader valve is interconnected to said spare tire and to said outer vessel so that said schrader valve can be used to supply air to said spare tire and can also be used to measure the pressure of the air inside of said spare tire.

4. The system of claim 1, wherein said check valve is configured to allow sufficient oil into said outer vessel when said engine is operating so as to maintain said oil within said outer vessel at a pressure which is substantially equal to the pressure of said oil in said engine oil gallery.

5. The system of claim 1, further comprising a control circuit which provides control signals to said solenoid valve so that said solenoid valve only opens when an ignition switch of said vehicle is moved from an off position to an on position and is then moved to a start position.

6. The system of claim 1, further comprising an inner vessel formed inside of said outer vessel and a turbo check valve in fluid communication with said inner vessel and an oil line for a turbocharger wherein said turbo check valve is configured to provide oil from said inner vessel to a turbocharger is response to said engine being shut down to thereby lubricate said turbocharger while said turbocharger coasts down to a stop.

7. The system of claim 6, wherein said inner vessel receives oil from an oil line which is providing oil to said turbocharger.

* * * * *